US007020282B1

(12) United States Patent
Chang

(10) Patent No.: US 7,020,282 B1
(45) Date of Patent: Mar. 28, 2006

(54) SIMPLIFIED SECURE, SWIFT CRYPTOGRAPHIC KEY EXCHANGE

(76) Inventor: Chung Nan Chang, 1455 Wessex Ave., Los Altos, CA (US) 95024

( * ) Notice: Subject to any disclaimer, the term of this patent is extended or adjusted under 35 U.S.C. 154(b) by 960 days.

(21) Appl. No.: 09/655,230

(22) Filed: Sep. 5, 2000

(51) Int. Cl.
H04L 9/00 (2006.01)
H04K 1/00 (2006.01)

(52) U.S. Cl. .......................... 380/44; 380/28; 380/30; 380/285; 713/171

(58) Field of Classification Search .................. 380/28, 380/44, 285, 284, 30; 713/171
See application file for complete search history.

(56) References Cited

U.S. PATENT DOCUMENTS

| | | | |
|---|---|---|---|
| 4,200,770 A * | 4/1980 | Hellman et al. ............... | 380/30 |
| 4,405,829 A | 9/1983 | Rivest | |
| 4,567,600 A | 1/1986 | Massey | |
| 4,956,863 A | 9/1990 | Goss | |
| 5,144,667 A | 9/1992 | Pogue, Jr. | |
| 5,150,411 A | 9/1992 | Maurer | |
| 5,159,632 A | 10/1992 | Crandall | |
| 5,271,061 A | 12/1993 | Crandall | |
| 5,581,616 A * | 12/1996 | Crandall ....................... | 380/28 |
| 5,805,703 A | 9/1998 | Crandall | |
| 5,835,592 A * | 11/1998 | Chang et al. ................ | 380/285 |
| 5,987,130 A * | 11/1999 | Chang ......................... | 380/283 |

OTHER PUBLICATIONS

Schneier, Bruce; Applied Cryptography; 1996; John Wiley & Sons, Inc.; 2nd Edition; Chapters 2 and 22.*

* cited by examiner

*Primary Examiner*—Gilberto Barron, Jr.
*Assistant Examiner*—Jung Kim
(74) *Attorney, Agent, or Firm*—Donald E. Schreiber

(57) ABSTRACT

One aspect of the present invention establishes a session key by a receiving unit R transmitting a plurality of quantities for storage in a public repository. A sending unit S:
  1. retrieves the plurality of quantities; and
  2. computes and transmits to the unit R a plurality of sender's quantities.
The unit R then:
  1. computes and transmits to the unit S at least one receiver's quantity; and
  2. computes the session key.
The unit S, using the receiver's quantity, computes the session key.

Another aspect provides a digital signature. Before transmitting a signed message, the unit S stores a plurality of quantities in the public repository. A unit R, that receives the message and the digital signature, verifies their authenticity by:
  1. retrieving the quantities from the repository;
  2. using the digital signature and the quantities, evaluates expressions in at least two (2) different relationships; and
  3. verifies the digital signature upon finding equality between evaluation results.

41 Claims, 1 Drawing Sheet

SIMPLIFIED SECURE, SWIFT CRYPTOGRAPHIC KEY EXCHANGE

BACKGROUND OF THE INVENTION

1. Field of the Invention

The present invention relates generally to cryptography and, more particularly, to exchanging cryptographic keys between two cryptographic units for a single cryptographic session, and to digital signature.

2. Description of the Prior Art

Two mutually-exclusive classes of cryptographic methods and protocols are well recognized by those familiar with cryptography, symmetric cryptography and public-key cryptography. In symmetric cryptographic protocols, the same key and cryptographic method are used both for encrypting a plaintext message into cyphertext, and for decrypting a cyphertext to recover the plaintext. It is readily apparent that the security of a symmetric cryptographic protocol can never exceed the security of the single key used both for encryption and decryption.

In conventional public-key cryptographic protocols there are two keys, a public key to which anyone can gain access and which is used only for encrypting a plaintext message, and a private key which only the recipient possesses and which is used only for decrypting a cyphertext. For such a public-key cryptographic protocol to be secure it must be unfeasible to determine the private key by analyzing the public key. While public-key cryptographic systems appear alluring, thus far in practice it has been observed that public-key cryptographic methods are significantly slower than symmetric cryptographic methods. In general, it has been found that public-key cryptographic methods are 1000 times slower than symmetric cryptographic methods. Furthermore, present public key cryptographic methods rely upon difficult but solvable mathematical problems, e.g. factoring large integers or discrete logarithms. Such techniques, while providing some security, can be broken by a cryptanalytic attack that is less exhausting than a brute force attack.

Managing the distribution of cryptographic keys is the most difficult security problem in using cryptography both for symmetric protocols and for public-key protocols. Developing secure cryptographic methods and protocols is not easy, but making sure the keys used with such methods and protocols remain secret is an even more difficult task. "Cryptanalysts often attack both symmetric and public-key cryptosystems through their key management." Schneier, *Applied Cryptography*, Second Edition© 1996 Bruce Schneier ("Schneier") p. 169.

For symmetric cryptographic protocols, there are three well recognized key management problems. First, a key may be compromised which permits an eavesdropper who obtains the key either to read all the cyphertext, or even to broadcast bogus cyphertext. The only way to alleviate this problem is to change keys frequently. A second problem for symmetric cryptography key management is that it requires a large number of keys if each pair of individuals in a group is to communicate using a different key. Forty-five unique keys are required if a group of 10 individuals are to communicate. Fifty-five unique keys are required for communication among a group of 11 individuals. The final problem for key management in symmetric cryptographic protocols is that, since keys are more valuable than the encrypted messages, the keys must be exchanged by a secure communication. One approach for securely distributing keys of a symmetric cryptographic protocol is to distribute them using a public-key cryptographic protocol.

Whether used with a symmetric cryptographic protocol or with a public-key cryptographic protocol, an encryption key should not be used indefinitely. First, the longer a key is used the more likely it will be compromised by theft, luck, extortion, bribery or cryptanalysis. Extended use of a key aids an eavesdropper because that provides more cyphertext encoded with the same key to which cryptoanalytic methods may be applied. Second, in general the longer a key is used the greater the loss if the key is compromised. Accordingly, it is not uncommon to encrypt each individual communication using a separate, session key that is used throughout only one particular communication session.

Schneier at pp. 41–68 provides an overview of protocols for digital signatures, key exchange, and authentication. Schneier at pp. 513–522 describes in greater detail various key exchange protocols that may be used to establish a session key including:

1. Shamir's Three-Pass protocol which does not use any secret or public keys;
2. a COMSET protocol which uses a public key technique that is equivalent to factoring a large integer; and
3. an Encrypted Key Exchange ("EKE") protocol that may be implemented with various different cryptographic methods such as:
   a. a Rivest, Shamir and Adleman ("RSA") public-key cryptographic method that is described in U.S. Pat. No. 4,405,829;
   b. an ElGamal public-key cryptographic method; and
   c. a Diffie-Hellman public-key cryptographic method that is described in U.S. Pat. No. 4,200,770.

U.S. Pat. Nos. 4,405,829 and 4,200,770 together with Schneier are hereby incorporated by reference.

While all of the preceding protocols provide some security for establishing a symmetric cryptographic key, the various protocols require exchanging several, time consuming communications between the parties to establish the key. Moreover, those protocols which require using a public-key cryptographic method also suffer from the slowness of such methods. Furthermore, the preceding key exchange protocols are no more secure than the cryptographic method which they employed for key exchange, all of which can be broken by cryptanalysis that is less exhausting than a brute force attack.

Protocols for key exchange have been developed that are secure against all but a brute force cryptanalytic attack. U.S. Pat. No. 5,583,939 ("the '939 patent") describes an exchange protocol which establish a session key useful for symmetric cryptography:

1. employing known and publicly identified mathematical functions; and
2. applied to exclusively private data, e.g. numbers.

In establishing this one-time key, an eavesdropper can learn both some of the numerical values selected by the parties in establishing the key, and also learn some of the numerical values computed using the known and publicly identified mathematical functions. The method disclosed in the '939 patent requires that the four known and publicly identified mathematical functions possess no inverse. That is, the four known and publicly identified functions must possess the property that knowing one of the quantities used in calculating a quantity and the calculated quantity, it is mathematically impossible to compute the other quantity used in performing the calculation. While the method disclosed in the '939 patent is swifter and simpler than previous methods, it requires initially transmitting at least two quantities between the sender and the receiver, followed by a single quantity between the receiver and the sender.

Another U.S. Pat. No. 5,987,130 ("the '130 patent") also describes an exchange protocol which establish a one-time key for use in symmetric cryptography:
1. employing known and publicly identified mathematical functions; and
2. applied to exclusively private data, i.e. numbers.

One of the ways in which the method for establishing a one-time key described in the '130 differs from that described in the '939 patent is that an eavesdropper cannot learn any numerical value selected by the parties in establishing the key. That is, the eavesdropper can learn only some of the numerical values computed using the known and publicly identified mathematical functions.

For the key exchange protocol described in the '130 patent a first of two cryptographic units "T" and "R" wishing to establish a cryptographic key "K" initially selects a first quantity "A". That same unit then uses a first mathematical function "$\Phi_1$" and the selected quantity "A" to compute a second quantity "B"=$\Phi_1(A)$. The computed quantity B and the function $\Phi_1$ must posses the property that knowing the computed quantity B, and the function $\Phi_1$, it is mathematically impossible to compute the selected quantity A. That same unit then uses a second mathematical function "$\Phi_2$" and the selected quantity "A" to compute a third quantity "C"=$\Phi_2(A)$. The first unit T or R which selected the quantity A then transmits the computed quantity B to the other, second unit R or T, while retaining at the first unit T or R the computed quantity C.

Upon receiving the quantity B transmitted by the first unit T or R, the second unit R or T first selects a fourth quantity "D." Then using a third mathematical function $\Phi_3$ together with the selected quantity D, the second unit T or R computes a fifth quantity "E"=$\Phi_3(D)$. The computed quantity E and the function $\Phi_3$ must possess the property that knowing the computed quantity E, and the function $\Phi_3$, it is mathematically impossible to compute the selected quantity D. That same unit then using a fourth mathematical function $\Phi_4$ together with the selected quantity D computes a sixth quantity "F"=$\Phi_4(D)$. The second unit R or T which selected the quantity D then transmits the computed quantity E to the other, first unit T or R, while retaining at the second unit R or T the computed quantity F.

Then the second unit R or T uses a fifth mathematical function "$\Psi_2$" together with the calculated quantity F and the received quantity B to compute the key "K"=$\Psi_2(F, B)=\Psi_2(\Phi_4\{D\}, \Phi_1\{A\})$. The first unit T or R upon receiving the quantity E transmitted by the unit R or T then uses a sixth mathematical function $\Psi_1$ together with the calculated quantity C and the received quantity E to compute the key "K"=$\Psi_1(C, E)=\Psi_1(_2\{A\}, \Phi_3\{D\})=\Psi_2(\Phi_4\{D\}, \Phi_1\{A\})$.

While the key exchange protocols disclosed both in the '939 and '130 patents permit establishing a session key for symmetric cryptography that an eavesdropper cannot crack except by using a brute force attack, it has not been possible to extend the disclosed techniques for use in digital signatures. The inability to extend the techniques disclosed in the '939 and '130 patents to digital signature appears to arise because the techniques disclosed there avoid using any pre-published, publicly available information in establishing the symmetric cryptographic key. Stated another way, while establishing the cryptographic key each party sends information to the other party on only one occasion, and therefor neither party publishes any information, other than the mathematical functions and the protocol for their use, before establishing the cryptographic key.

SUMMARY OF THE INVENTION

An object of the present invention is to provide a cryptographic key exchange protocol which employs pre-established, publicly available information that is provably secure.

Another object of the present invention is to provide a cryptographic key exchange protocol that is faster than conventional protocols.

Another object of the present invention is to provide an encryption key exchange protocol that is secure against all but a brute force cryptanalytic attack.

Another object of the present invention is to provide an improved, verifiable digital signature.

Another object of the present invention is to provide a digital signature that is secure against all but a brute force cryptanalytic attack.

Briefly, the present invention includes a protocol for cryptographic communication via a communication channel "I" in which a sending cryptographic unit "S" transmits onto the communication channel I an encrypted cyphertext message "M." The sending cryptographic unit "S" obtains the encrypted cyphertext message "M" by supplying both a plaintext message "P" and a cryptographic key "K" to a first cryptographic device. A receiving cryptographic unit "R" receives the cyphertext message M from the communication channel I, and supplies the cyphertext message M together with the key K to a second cryptographic device. The second cryptographic device decrypts the plaintext message P from cyphertext message M.

In one aspect, the present invention is a method by which the units S and R mutually establish a cryptographic key K by first exchanging quantities before the sending unit S transmits the cyphertext message M. The method includes the receiving unit R transmitting for storage in a publicly accessible repository a plurality of public quantities. The sending unit S:
1. retrieves the plurality of public quantities from the publicly accessible repository; and
2. using at least some of the plurality of public quantities, computes and transmits to the receiving unit R a plurality of sender's quantities.

The receiving unit R, using at least some of the plurality of public quantities and at least one of the plurality of sender's quantities received from the sending unit S:
1. computes and transmits to the sending unit S at least one receiver's quantity; and
2. computes the session key K.

The sending unit S, using at least some of the plurality of public quantities and the receiver's quantity received from the receiving unit R, computes the session key K.

In another aspect, the present invention is a protocol for communication in which a sending unit S transmits onto the communication channel I a message "M" together with a digital signature. However, before transmitting the message M and the digital signature, the sending unit S transmits for storage in the publicly accessible repository a plurality of public quantities. In the method of the present invention, a receiving unit R, that receives the message M and the digital signature, verifies the authenticity of digital signature as follows. The receiving unit R:
1. retrieves the plurality of public quantities from the publicly accessible repository;

2. using the digital signature and the plurality of public quantities, obtains at least two (2) results by evaluating expressions of at least two (2) different relationships; and 3. compares both pairs of results obtained by evaluating the expressions of the at least two (2) different relationships.

Finding that the results obtained by evaluating the expressions for at least two (2) different relationships are equal verifies the digital signature.

These and other features, objects and advantages will be understood or apparent to those of ordinary skill in the art from the following detailed description of the preferred embodiment as illustrated in the drawing figure.

DETAILED DESCRIPTION OF THE PREFERRED EMBODIMENT

Figure 1:
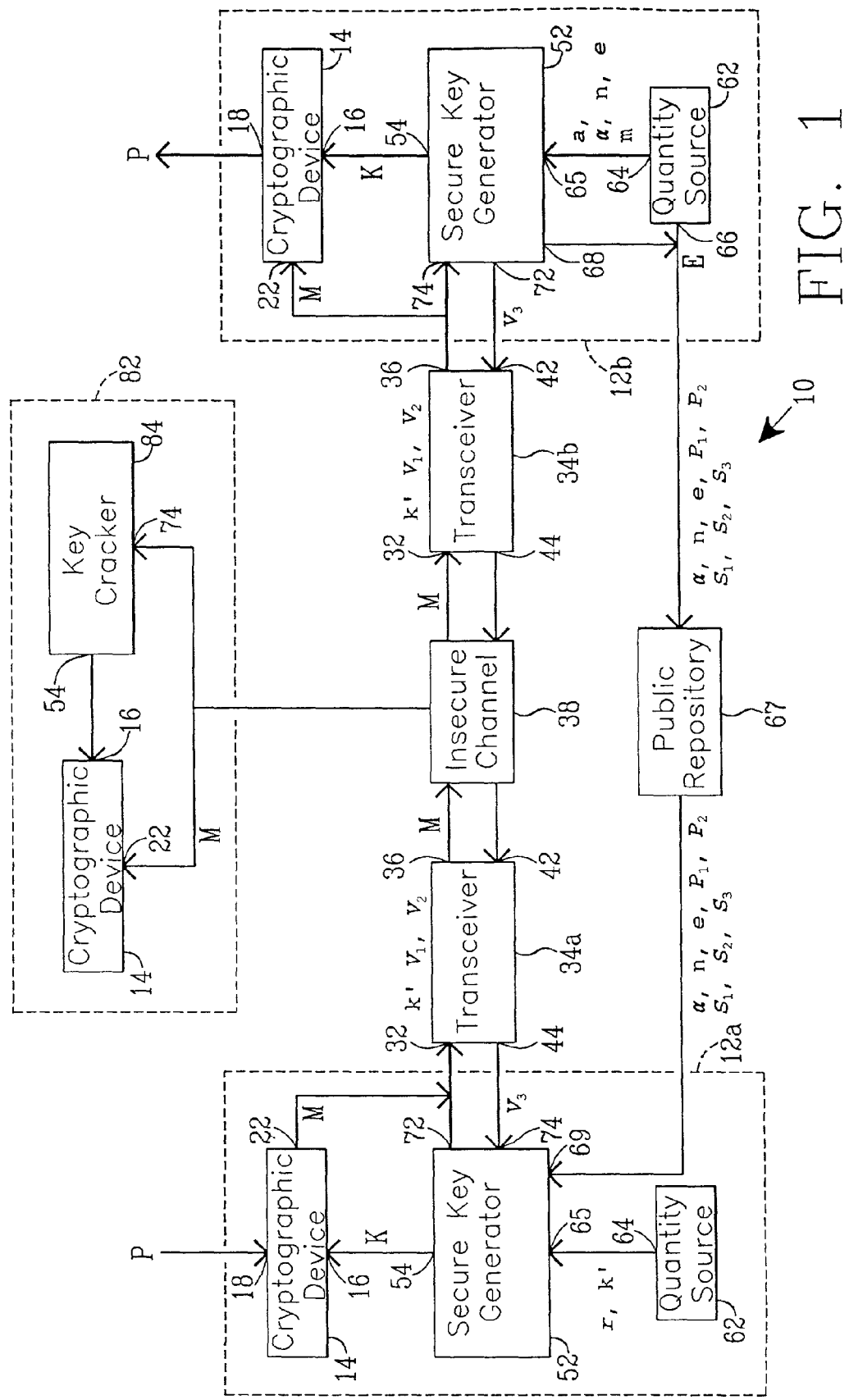
FIG. 1 is a block diagram depicting a cryptographic system which may be employed for secure cryptographic key exchange and digital signature via an insecure communication channel.

FIG. 1 illustrates a cryptographic system which may be employed for cryptographic key exchange that is referred to by the general reference character 10. The cryptographic system 10 includes a sender's cryptographic unit 12a, enclosed within a dashed line, and a receiver's cryptographic unit 12b, also enclosed within a dashed line. One particular unit has been assigned as the sender's cryptographic unit 12a and another unit has been assigned as the receiver's cryptographic unit 12b only for pedagogical reasons. In principle, either unit could be the sender or the receiver. Each of the cryptographic units 12a and 12b respectively includes a cryptographic device 14. Each cryptographic device 14 includes a key input port 16, a plaintext port 18, and a cyphertext port 22.

The illustration of FIG. 1 depicts the cyphertext port 22 of the cryptographic device 14 included in the sender's cryptographic unit 12a as being coupled to a first input port 32 of a first transceiver 34a. Consequently, the cyphertext port 22 may supply a cyphertext message "M" to the first transceiver 34a. The first transceiver 34a also includes a first output port 36 from which the first transceiver 34a transmits the cyphertext message M via an insecure communication channel 38 to a first input port 32 of a second transceiver 34b. The insecure communication channel 38 may include a telephone link, a radio link, a microwave link, a coaxial cable link, a fiber optic link, or any other communication technology that permits transmitting data from a first location to a second location. Thus, for example, while an electronic or optical communication technology is presently preferred for the insecure communication channel 38, the insecure communication channel 38 might also include a messenger service, or a postal service. For a telephonic insecure communication channel 38, the transceivers 34a and 34b might each respectively be conventional modems. Upon receipt of the cyphertext message M at the first input port 32 of the second transceiver 34b, the second transceiver 34b transmits the cyphertext message M from a first output port 36 to the cyphertext port 22 of the cryptographic device 14 included in the receiver's cryptographic unit 12b.

Arranged as described above and as illustrated in FIG. 1, the cryptographic units 12a and 12b provide a cryptographic system 10 in which a plaintext message P may be:

1. presented to the plaintext port 18 of the cryptographic device 14 included in the sender's cryptographic unit 12a;
2. encrypted by the cryptographic device 14 into the cyphertext message M;
3. transmitted from the cyphertext port 22 of the cryptographic device 14 via:
   a. the first transceiver 34a;
   b. the insecure communication channel 38; and
   c. the second transceiver 34b to the cyphertext port 22 of the cryptographic device 14 of the receiver's cryptographic unit 12b;

4. decrypted by the cryptographic device 14 back into the plaintext message P; and
5. transmitted from the plaintext port 18 of the cryptographic device 14 included in the receiver's cryptographic unit 12b.

Alternatively, though not illustrated in FIG. 1, the cryptographic system 10 could be arranged so the plaintext message P is transmitted as a cyphertext message M from the cryptographic unit 12b to the cryptographic unit 12a. To effect such a reverse transmission of the plaintext message P, the cyphertext port 22 of the cryptographic device 14 included in the cryptographic unit 12b would be coupled to a second input 42 of the second transceiver 34b rather than to its first output port 36. A second output 44 of the second transceiver 34b would then transmit the cyphertext message M via the insecure communication channel 38 to a second input 42 of the first transceiver 34a. A second output 44 of the first transceiver 34a, rather than its first input port 32, would then be coupled to the cyphertext port 22 of the cryptographic device 14 included in the cryptographic unit 12a. Accordingly, in principle the cryptographic system 10 illustrated in FIG. 1 is capable of being configured for cryptographic transmission of the plaintext message P either from the cryptographic unit 12a to the cryptographic unit 12b as depicted in FIG. 1, or from the cryptographic unit 12b to the cryptographic unit 12a.

The precise cyphertext message M transmitted between the cryptographic units 12a and 12b depends not only upon the plaintext message P, but also upon a particular cryptographic method employed by the cryptographic device 14 for encryption and/or decryption, and upon a cryptographic key "K" respectively supplied to the key input port 16 of each cryptographic device 14. To supply a cryptographic key K to each cryptographic device 14, both cryptographic units 12a and 12b in accordance with the present invention respectively include a key generator 52 having a key output port 54 from which the key generator 52 transmits the cryptographic key K to the cryptographic device 14.

The cryptographic system 10 depicted in FIG. 1 employs a symmetric cryptographic method for encrypting the plaintext message P, and for decrypting the cyphertext message M. Accordingly, in the illustration of FIG. 1, the cryptographic key $K^\sim$ supplied by the key generator 52 to the cryptographic device 14 of the sender's cryptographic unit 12a is identical to the cryptographic key $K^\sim$ supplied by the key generator 52 to the cryptographic device 14 of the receiver's cryptographic unit 12b. Described below is the protocol by which the cryptographic units 12a and 12b may mutually establish a cryptographic key $K^\sim$ in accordance with the present invention by exchanging messages between the cryptographic units 12a and 12b via the first transceiver 34a, the insecure communication channel 38 and the second transceiver 34b.

Secure Key Exchange

To permit establishing a secure session key to be used during communication between the cryptographic units 12a and 12b, a quantity source 62 included in the receiver's cryptographic unit 12b first generates a private, three-element vector $a=(a_1, a_2, a_3)$. The quantity source 62 then transmits the vector a from a quantity output port 64 of the quantity source 62 to a quantity input port 65 of the key generator 52 included in the receiver's cryptographic unit 12b. That quantity source 62 then continues to generate and transmit to the key generator 52 three (3) more quantities listed below.

1. a first three-element vector $\alpha=(\alpha_1, \alpha_2, \alpha_3)$
2. a large integer n
3. a second three-element vector $e=(e_1, e_2, e_3)$ Numbers in the four (4) quantities listed above are all integers chosen from a finite number set that are preferably obtained using a random number generator. Furthermore, the vector items obtained in this way, i.e. a, $\alpha$ and e, must be linearly independent. In addition to transmitting the four (4) quantities to the key generator 52, the receiver's cryptographic unit 12b also transmits the final three (3) quantities identified above, i.e. items 1, 2 and 3, from a publication port 66 of the quantity source 62 for storage in a public repository 67 from which anyone may retrieve them.

After the key generator 52 receives the vector a and the three (3) quantities $\alpha$, n, and e that the quantity source 62 transmits to the public repository 67, the key generator 52 computes and also transmits to the public repository 67 from a publication port 68 two (2) more quantities listed below.

4. a third three-element vector $(e \times a)+(e \cdot \alpha)^n e$
5. a fourth three-element vector $$((e \cdot \alpha \times \alpha)^n + (e \cdot \alpha \times \alpha))(e \times \alpha) \times (\alpha \times \alpha)$$

When the sender's cryptographic unit 12a wants to establish a secure session cryptographic key K for communication with cryptographic unit 12b, the quantity source 62 of the cryptographic unit 12a generates a private, three-element vector $r=(r_1, r_2, r_3)$ of random integers chosen from a finite number set. The quantity source 62 transmits the vector r from the quantity output port 64 to the quantity input port 65 of the key generator 52. That quantity source 62 then continues to generate and transmit to the key generator 52 a one-time randomly chosen integer parameter k'. After the key generator 52 receives the vector r and the parameter k', the key generator 52 first retrieves from the public repository 67 through a public-key retrieval-port 69 the five (5) quantities stored there by the receiver's cryptographic unit 12b. Having retrieved those five (5) quantities, the sender's cryptographic unit 12a then computes two vector (2) quantities listed below.

$$V_1 = r^{k'}(e \cdot \alpha \times r)\{[((e \cdot \alpha \times \alpha)^n + (e \cdot \alpha \times \alpha))(e \times \alpha) \times (\alpha \times \alpha)] \times r\} \times r$$

$$V_2 = [((e \cdot \alpha \times r)^n + (e \cdot x \times r))(e \times r) \times (\alpha \times r)]$$

After computing the two vector quantities $V_1$ and $V_2$, the key generator 52 of the sender's cryptographic unit 12a then transmits them together with the parameter k' to the receiver's cryptographic unit 12b via an output port 72, the first transceiver 34a, insecure communication channel 38, second transceiver 34b and an input port 74 of the key generator 52.

After the receiver's cryptographic unit 12b receives the parameter k' and the two vector quantities $V_1$ and $V_2$, the key generator 52 of the receiver's cryptographic unit 12b then computes the following vector and transmits it to the cryptographic unit 12a via an output port 72, the second transceiver 34b, insecure communication channel 38, first transceiver 34a and an input port 74 of the key generator 52.

$$V_3 = a^{k'}(e \cdot \alpha \times \alpha)\{V_2 \times \alpha\} \times \alpha$$

$$V_3 = a^{k'}(e \cdot \alpha \times \alpha)\{[((e \cdot \alpha \times r)^n + (e \cdot \alpha \times r))(e \times r) \times (\alpha \times r)] \times \alpha\} \times \alpha$$

After the sender's cryptographic unit 12a receives the vector quantity $V_3$, the cryptographic units 12a and 12b then possess all the data needed to independently establish the session cryptographic key K.

The receiver's cryptographic unit 12b computes the session cryptographic key K as follows.

$$K = (V_1 \cdot \alpha)^*(a^{k'}/((e \cdot \alpha \times \alpha)^n + (e \cdot \alpha \times \alpha)))$$

$$K = ([r^{k'}(e \cdot \alpha \times r)\{[((e \cdot \alpha \times \alpha)^n + (e \cdot \alpha \times \alpha))(e \times \alpha) \times (\alpha \times \alpha)] \times r\} \times r] \cdot \alpha)^*(a^{k'}/((e \cdot \alpha \times \alpha)^n + (e \cdot \alpha \times \alpha)))$$

$$K = r^{k'}a^{k'}(e \cdot \alpha \times r)(e \cdot \alpha \times \alpha)((r \cdot \alpha)^2 - (r \cdot r)(\alpha \cdot \alpha))$$

The sender's cryptographic unit 12a computes the session crypto-graphic key K as follows.

$$K = (V_3 \cdot r)^*(r^{k'}/[((e \cdot \alpha \times r)^n + (e \cdot \alpha \times r)))$$

$$K = ([a^{k'}(e \cdot \alpha \times \alpha)\{[((e \cdot \alpha \times r)^n + (e \cdot \alpha \times r))(e \times r) \times (\alpha \times r)] \times \alpha\} \times \alpha] \cdot r)^*(r^{k'}/[((e \cdot \alpha \times r)^n + (e \cdot \alpha \times r)))$$

$$K = r^{k'}a^{k'}(e \cdot \alpha \times r)(e \cdot \alpha \times \alpha)((r \cdot \alpha)^2 - (r \cdot r)(\alpha \cdot \alpha))$$

Because the cryptographic system 10 includes the insecure communication channel 38, an eavesdropper 82, which is not included in the cryptographic system 10 and which is enclosed within a dashed line in FIG. 1, may receive all of the communications between the cryptographic units 12a and 12b. Furthermore, the eavesdropper 82 has access to the public quantities stored in the public repository 67. The eavesdropper 82 includes a cryptographic device 14 which is functionally identical to, and may in principle be the same as, the cryptographic device 14 included both in the cryptographic units 12a and 12b. Therefore, if the eavesdropper 82 were able to determine the cryptographic key K using a key cracker 84 (e.g. by applying an inverse function to the quantities communicated between cryptographic units 12a and 12b during key exchange and/or to the public quantities stored in the public repository 67) and supply the cryptographic key K to a key input port 16 of the cryptographic device 14, the eavesdropper 82 could decrypt the cyphertext message M to read the plaintext message P. Furthermore, if the eavesdropper 82 possesses the cryptographic key K, the eavesdropper 82 could then also transmit bogus cyphertext message M either to the sender's cryptographic unit 12a, to the receiver's cryptographic unit 12b, or to both.

In 1826 Neils Henrik Abel proved that a general equation of fifth or higher order can not be express in terms of radicals. In other words, such an equation can not be solved using purely algebraic means. For the real number system, such an equation can be solved using complex numbers, or a numerical approximation. However, such techniques are inapplicable to discrete, finite number system used for cryptography.

For n>3, there exists no analytic method for computing the private, three-element vector a from $V_2$ since:

$$((e \cdot \alpha \times r)^n + (e \cdot \alpha \times r))(e \times \alpha) \times (\alpha \times \alpha) \cdot e \times \alpha = (e \cdot \alpha \times \alpha)^{n+2} + (e \cdot \alpha \times \alpha)^3$$

And for the same reason there exists no analytic method for computing the private, three-element vector a from the public vector quantities described above and set forth below that are stored in the public repository 67.

$$(e \times a) + (e \cdot \alpha)^n e$$

$$((e \cdot \alpha \times \alpha)^n + (e \cdot \alpha \times \alpha))(e \times \pi) \times (\alpha \times \alpha)$$

Verifiable Digital Signature

The preceding key exchange protocol may be augmented with additional quantities that allow the cryptographic unit 12b to append verifiable digital signatures to transmitted messages. First, in addition to selecting private, three-element vector a, the quantity source 62 of the cryptographic unit 12b also selects a large, private integer m that it provides to the key generator 52. Using the integer m, the key generator 52 then computes and transmits to the public repository 67 three (3) additional public vectors.

6. a fifth three-element vector $S_1 = m^{a \times (e \times \alpha)}$
7. a sixth three-element vector $S_2 = m^{a \times e \ (e \cdot \alpha)^n}$
8. a seventh three-element vector $S_3 = m^{((e \cdot \alpha \times \alpha)^n + (e \cdot \alpha \times \alpha))}$ $$((e \times \alpha) \times ((\alpha \times \alpha) \times e) \times \alpha$$

Having stored the vectors $S_1$, $S_2$ and $S_3$ in the public repository 67, the cryptographic unit 12b may then append a digital signature to a message, either the plaintext message P or the cyphertext message M, in the following way. Assuming that the cryptographic unit 12b wants to append a digital signature to the plaintext message P, it first hashes the message P to obtain a three element vector p. After establishing the vector p, the cryptographic unit 12b then appends to the plaintext message P as the digital signature the following three element vector.

$$m^{((a \cdot p)^n)(e \times (e \times \alpha))) + a \times p}$$

After retrieving the public quantities that have been stored in the public repository 67, anyone receiving the plaintext message P to which the cryptographic unit 12b has appended the digital signature can verify the signature's authenticity by evaluating and comparing verification expressions set forth the two following pairs of verification relationships.

$$m^{((a \cdot p)^n)(e \times (e \times \alpha)) + a \times p) \cdot ((e \times \alpha) + (e \cdot \alpha)^n e))} \stackrel{?}{=} m^{-a \times (e \times \alpha) \cdot p}$$
$$m^{-a \times e(e \cdot \alpha)^n p} \qquad 1.$$

$$m^{((a \cdot p)^n)(e \times (e \times \alpha)) + a \times p) \cdot ((e \cdot \alpha \times \alpha)^n + (e \cdot \alpha \times \alpha)(e \times \alpha) \times (\alpha \times \alpha)}$$
$$\times e \stackrel{?}{=} m^{-((e \cdot \alpha \times \alpha)^n + (e \cdot \alpha \times \alpha)((e \times \alpha) \times ((\alpha \times \alpha) \times e) \times \alpha \cdot p}$$

Finding that the quantities obtained by evaluating the two expressions on both sides of the $\stackrel{?}{=}$ in verification relationship no. 1 above are identical, and also finding that the quantities obtained by evaluating the two expressions on both sides of the $\stackrel{?}{=}$ in verification relationship no. 2 above are identical, verifies the digital signature.

The first expression set forth above prevents a forger from appending a known quantity $m^{a \times p}$ to the plaintext message P as the signature. The second expression ensures that the cryptographic unit 12b has used the private vector a in computing the digital signature.

Considering the public non-linear quantity that includes the term a×(e×a), solving for the private, three-element vector a requires finding the roots of at least an $8^{th}$ order polynomial. For the reason stated above, there exists no analytic method for finding the roots an $8^{th}$ order polynomial. Consequently, cryptanalysts can find the private, three-element vector a only by brute force.

There exist other expressions, in addition to the three (3) set forth above, which the cryptographic unit 12b might store in the public repository 67 for use in digital signature verification. For example, in an appropriately configured protocol the cryptographic unit 12b might store the vector quantity $m^{(a \cdot \alpha)e \times \alpha}$ in the public repository 67. To verify the digital signature, anyone receiving a message from cryptographic unit 12b with a digital signature appended thereto would then evaluate the following expression.

$$m^{a \times p \cdot a \times (\alpha \times \alpha)} = m^{(a \cdot \alpha) e \times \alpha \cdot p}.$$

Although the present invention has been described in terms of the presently preferred embodiment, it is to be understood that such disclosure is purely illustrative and is not to be interpreted as limiting. For example, as those skilled in the art will understand, after the cryptographic units 12a and 12b have established the session key K in accordance with the present invention, either of the cryptographic units 12a or 12b may send or may receive cyphertext messages $M_i$ from the other in any arbitrary order. Analogously, while the digital signature technique may be used with the plaintext message P, it may also be used to authenticate the cyphertext message M. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In a protocol for cryptographic communication via a communication channel "I" in which a sending cryptographic unit "S" transmits onto the communication channel I an encrypted cyphertext message "M" obtained by supplying both a plaintext message "P" and a cryptographic key "K" to a first cryptographic device, and in which a receiving cryptographic unit "R" receives the cyphertext message M from the communication channel I and by supplying the cyphertext message M together with the key K to a second cryptographic device decrypts the plaintext message P therefrom, a method by which the units S and R mutually establish a cryptographic key K by first exchanging messages before the sending unit S transmits the cyphertext message M comprising the steps of:

a. the receiving unit R transmitting for storage in a publicly accessible repository a plurality of public quantities;
b. the sending unit S:
  i. retrieving the plurality of public quantities from the publicly accessible repository; and
  ii. using at least some of the plurality of public quantities, computing and transmitting to the receiving unit R a plurality of sender's quantities;
c. the receiving unit R, using at least some of the plurality of public quantities and at least one of the plurality of sender's quantities received from the sending unit S:
  i. computing and transmitting to the sending unit S at least one receiver's quantity; and
  ii. computing the key K; and
d. the sending unit S, using at least some of the plurality of public quantities and the receiver's quantity received from the receiving unit R, computing the key K.

2. The method of claim 1 wherein the receiving unit R, in storing the plurality of public quantities into the publicly accessible repository:
  i. selects a receiver's secret quantity;
  ii. selects for storage in the publicly accessible repository as part of the plurality of public quantities a plurality of selected public quantities; and
  iii. using the receiver's secret quantity and the plurality of selected public quantities, computes and stores in the publicly accessible repository as part of the plurality of public quantities a plurality of computed public quantities.

3. The method of claim 2 wherein the plurality of public quantities include a plurality of vectors.

4. The method of claim 2 wherein the plurality of selected public quantities include a plurality of vectors.

5. The method of claim 2 wherein the plurality of computed public quantities include a plurality of vectors.

6. The method of claim 2 wherein the sending unit S, in computing the plurality of sender's quantities for transmission to the receiving unit R:
  i. selects a sender's secret quantity;
  ii. selects and transmits to the receiving unit R a one-time parameter; and
  iii. using the sender's secret quantity, the one-time parameter and at least some of the retrieved plurality of public quantities, computes for transmission to the receiving unit R the plurality of sender's quantities.

7. The method of claim 6 wherein the plurality of sender's quantities include a plurality of vectors.

8. The method of claim 6 wherein the receiving unit R, in computing for transmission to the sending unit S the at least one receiver's quantity, uses the receiver's secret quantity, at least some of the plurality of public quantities, and at least one of the plurality of sender's quantities received from the sending unit S.

9. The method of claim 8 wherein the receiver's quantity includes at least one vector.

10. The method of claim 1 wherein the sending unit S, in computing the plurality of sender's quantities for transmission to the receiving unit R:
  i. selects a sender's secret quantity;
  ii. selects and transmits to the receiving unit R a one-time parameter; and
  iii. using the sender's secret quantity, the one-time parameter and at least some of the retrieved plurality of public quantities, computes for transmission to the receiving unit R the plurality of sender's quantities.

11. The method of claim 10 wherein the plurality of sender's quantities include a plurality of vectors.

12. The method of claim 1 wherein the receiving unit R, in computing for transmission to the sending unit S the at least one receiver's quantity, uses a receiver's secret quantity, at least some of the plurality of public quantities, and at least one of the plurality of sender's quantities received from the sending unit S.

13. The method of claim 12 wherein the receiver's quantity includes at least one vector.

14. A system adapted for communicating as an encrypted cyphertext message M a plaintext message P that has been encoded using a cryptographic key K, the system comprising:
  a. a communication channel I adapted for transmitting the cyphertext message M;
  b. a pair of transceivers that are coupled to said communication channel I, and that are adapted for communicating the cyphertext message M from one transceiver to the other transceiver via said communication channel I; and
  c. a pair of cryptographic units each of which is respectively coupled to one of said transceivers for transmitting the cyphertext message M thereto or receiving the cyphertext message M therefrom, each cryptographic unit:
    i. when the cryptographic unit is to receive the cyphertext message M:
      (1) storing plurality of public quantities in a publicly accessible repository;
      (2) receiving via the communication channel I a plurality of sender's quantities from a sending cryptographic unit, and using the plurality of sender's quantities and at least some of the plurality of public quantities in computing:
        (a) at least one receiver's quantity which said receiving cryptographic unit transmits via the communication channel I to said sending cryptographic unit; and
        (b) the key K; and
    ii. when the cryptographic unit is to send the cyphertext message M, retrieving the plurality of public quantities from the publicly accessible repository and using them in computing:
      (1) the plurality of sender's quantities which the sending cryptographic unit transmits via the communication channel I to the receiving cryptographic unit; and
      (2) after receiving via the communication channel I the receiver's quantity from the receiving cryptographic unit, the key K; and
    iii. including a cryptographic device having:
      (1) a key input port for receiving the key K from the cryptographic unit;
      (2) a plaintext port:
        (a) for accepting the plaintext message P for encryption into the cyphertext message M that is transmitted from the cryptographic device, and
        (b) for delivering the plaintext message P obtained by decrypting the cyphertext message M received by the cryptographic device; and
      (3) a cyphertext port that is coupled to one of said transceivers:
        (a) for transmitting the cyphertext message M to such transceiver, and
        (b) for receiving the cyphertext message M from such transceiver.

15. The system of claim 14 wherein said cryptographic unit which receives the cyphertext message M in storing the plurality of public quantities into the publicly accessible repository:
  (a) selects a receiver's secret quantity;
  (b) selects for storage in the publicly accessible repository as part of the plurality of public quantities a plurality of selected public quantities; and
  (c) using the receiver's secret quantity and the plurality of selected public quantities, computes and stores in the publicly accessible repository as part of the plurality of public quantities a plurality of computed public quantities.

16. The system of claim 15 wherein the plurality of public quantities include a plurality of vectors.

17. The system of claim 15 wherein the plurality of selected public quantities include a plurality of vectors.

18. The system of claim 15 wherein the plurality of computed public quantities include a plurality of vectors.

19. The system of claim 15 wherein the sending cryptographic unit, in computing the plurality of sender's quantities for transmission to the receiving cryptographic unit:
  i. selects a sender's secret quantity;
  ii. selects and transmits to the receiving cryptographic unit a one-time parameter; and
  iii. using the sender's secret quantity, the one-time parameter and at least some of the retrieved plurality of public quantities, computes for transmission to the receiving cryptographic unit the plurality of sender's quantities.

20. The system of claim 19 wherein the plurality of sender's quantities include a plurality of vectors.

21. The system of claim 19 wherein the receiving cryptographic unit, in computing for transmission to the sending cryptographic unit the at least one receiver's quantity, uses the receiver's secret quantity, at least some of the plurality of public quantities, and at least one of the plurality of sender's quantities received from the sending cryptographic unit.

22. The system of claim 21 wherein the receiver's quantity includes at least one vector.

23. The system of claim 14 wherein the sending cryptographic unit, in computing the plurality of sender's quantities for transmission to the receiving cryptographic unit:
  i. selects a sender's secret quantity;
  ii. selects and transmits to the receiving cryptographic unit a one-time parameter; and
  iii. using the sender's secret quantity, the one-time parameter and at least some of the retrieved plurality of public quantities, computes for transmission to the receiving cryptographic unit the plurality of sender's quantities.

24. The system of claim 23 wherein the plurality of sender's quantities include a plurality of vectors.

25. The system of claim 14 wherein the receiving cryptographic unit, in computing for transmission to the sending cryptographic unit the at least one receiver's quantity, uses a receiver's secret quantity, at least some of the plurality of public quantities, and at least one of the plurality of sender's quantities received from the sending cryptographic unit.

26. The system of claim 25 wherein the receiver's quantity includes at least one vector.

27. A cryptographic unit adapted for inclusion in a system for communicating as an encrypted cyphertext message M a plaintext message P that has been encoded using a cryptographic key K, the system including:
  a. a communication channel I adapted for transmitting the cyphertext message M; and
  b. a pair of transceivers that are coupled to said communication channel I, and that are adapted for communicating the cyphertext message M from one transceiver to the other transceiver via said communication channel I;
the cryptographic unit being adapted for coupling to said transceivers for transmitting the cyphertext message M thereto or receiving the cyphertext message M therefrom, and comprising:
  a. ports:
    i. when the cryptographic unit is to receive the cyphertext message M, for:
      (1) storing plurality of public quantities in a publicly accessible repository;
      (2) receiving via the communication channel I a plurality of sender's quantities from a sending cryptographic unit, and the receiving cryptographic unit using the plurality of sender's quantities and at least some of the plurality of public quantities in computing:
        (a) at least one receiver's quantity which said receiving cryptographic unit transmits via the communication channel I to said sending cryptographic unit; and
        (b) the key K; and
    ii. when the cryptographic unit is to send the cyphertext message M, for retrieving the plurality of public quantities from the publicly accessible repository, the sending cryptographic unit using the retrieved plurality of public quantities in computing:
      (1) the plurality of sender's quantities which the sending cryptographic unit transmits via the communication channel I to the receiving cryptographic unit; and
      (2) after receiving via the communication channel I the receiver's quantity from the receiving cryptographic unit, the key K; and
  b. a cryptographic device having:
    i. a key input port for receiving the key K from the cryptographic unit;
    ii. a plaintext port:
      (1) for accepting the plaintext message P for encryption into the cyphertext message M that is transmitted from the cryptographic device, and
      (2) for delivering the plaintext message P obtained by decrypting the cyphertext message M received by the cryptographic device; and
    ii. a cyphertext port that is coupled to one of said transceivers:
      (1) for transmitting the cyphertext message M to such transceiver, and
      (2) for receiving the cyphertext message M from such transceiver.

28. The cryptographic unit of claim 27 wherein, when receiving the cyphertext message M, in storing the plurality of public quantities into the publicly accessible repository:
  (a) selects a receiver's secret quantity;
  (b) selects for storage in the publicly accessible repository as part of the plurality of public quantities a plurality of selected public quantities; and
  (c) using the receiver's secret quantity and the plurality of selected public quantities, computes for storage in the publicly accessible repository as part of the plurality of public quantities a plurality of computed public quantities.

29. The cryptographic unit of claim 28 wherein the plurality of public quantities include a plurality of vectors.

30. The cryptographic unit of claim 28 wherein the plurality of selected public quantities include a plurality of vectors.

31. The cryptographic unit of claim 28 wherein the plurality of computed public quantities include a plurality of vectors.

32. The cryptographic unit of claim 28, when sending the cyphertext message M, in computing the plurality of sender's quantities for transmission to the receiving cryptographic unit:
  i. selects a sender's secret quantity;
  ii. selects and transmits to the receiving cryptographic unit a one-time parameter; and
  iii. using the sender's secret quantity, the one-time parameter and at least some of the retrieved plurality of public quantities, computes for transmission to the receiving cryptographic unit the plurality of sender's quantities.

33. The cryptographic unit of claim 32 wherein the plurality of sender's quantities include a plurality of vectors.

34. The cryptographic unit of claim 32 wherein, when receiving the cyphertext message M, in computing for transmission to the sending cryptographic unit the at least one receiver's quantity, uses the receiver's secret quantity, at least some of the plurality of public quantities, and at least one of the plurality of sender's quantities received from the sending cryptographic unit.

35. The cryptographic unit of claim 34 wherein the receiver's quantity includes at least one vector.

36. The cryptographic unit of claim 27 wherein, when sending the cyphertext message M, in computing the plurality of sender's quantities for transmission to the receiving cryptographic unit:
  i. selects a sender's secret quantity;
  ii. selects and transmits to the receiving cryptographic unit a one-time parameter; and
  iii. using the sender's secret quantity, the one-time parameter and at least some of the retrieved plurality of public quantities, computes for transmission to the receiving cryptographic unit the plurality of sender's quantities.

37. The cryptographic unit of claim 36 wherein the plurality of sender's quantities include a plurality of vectors.

38. The cryptographic unit of claim 27 wherein, when receiving the cyphertext message M, in computing for transmission to the sending cryptographic unit the at least one receiver's quantity, uses a receiver's secret quantity, at least some of the plurality of public quantities, and at least one of the plurality of sender's quantities received from the sending cryptographic unit.

39. The cryptographic unit of claim 38 wherein the receiver's quantity includes at least one vector.

40. In a protocol for communication in which a sending unit S transmits onto the communication channel I a message "M" together with a digital signature, and, wherein before transmitting the message M and the digital signature, the sending unit S transmits for storage in a publicly accessible repository a plurality of public quantities, a method by which a receiving unit R that receives the message M and the digital signature verifies the authenticity of digital signature comprising the steps performed by the receiving unit R of:
  a. retrieving the plurality of public quantities from the publicly accessible repository;
  b. using the digital signature and the plurality of public quantities, evaluating expressions of at least two (2) different verification relationships; and
  c. comparing pairs of results obtained by evaluating the expressions of the at least two (2) different verification relationships.

41. The method of claim 40 wherein the plurality of public quantities include a plurality of vectors.

* * * * *